US006232273B1

(12) United States Patent
Namba et al.

(10) Patent No.: US 6,232,273 B1
(45) Date of Patent: *May 15, 2001

(54) CLATHRATE HYDRATE INHIBITOR AND METHOD OF INHIBITING THE FORMATION OF CLATHRATE HYDRATES USING IT

(75) Inventors: Takashi Namba, Osaka; Yoshikazu Fujii; Takuya Saeki, both of Hyogo; Hiyora Kobayashi, Osaka, all of (JP)

(73) Assignee: Nippon Shokubai Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,194

(22) PCT Filed: May 30, 1996

(86) PCT No.: PCT/JP96/01470

§ 371 Date: May 7, 1998

§ 102(e) Date: May 7, 1998

(87) PCT Pub. No.: WO96/38492

PCT Pub. Date: Dec. 5, 1996

(30) Foreign Application Priority Data

Jun. 2, 1995 (JP) ..................... 7-137051
Dec. 12, 1995 (JP) ..................... 7-323304

(51) Int. Cl.[7] ..................... C09K 3/00; C07C 9/00; B01D 47/00

(52) U.S. Cl. ..................... 507/90; 585/15; 585/950; 95/153

(58) Field of Search ..................... 507/90; 585/15, 585/950; 95/153

(56) References Cited

U.S. PATENT DOCUMENTS

| | | | | |
|---|---|---|---|---|
| H1749 | * | 9/1998 | Colle et al. | 585/15 |
| 4,201,858 | | 5/1980 | Crutchfield et al. | 528/232 |
| 4,680,339 | | 7/1987 | Fong | 525/54.11 |
| 5,087,682 | | 2/1992 | Iovine et al. | 526/271 |
| 5,244,878 | * | 9/1993 | Sugier et al. | 507/90 |
| 5,420,370 | * | 5/1995 | Sloan, Jr. | 585/15 |
| 5,583,273 | * | 12/1996 | Colle et al. | 585/15 |
| 5,600,044 | * | 2/1997 | Colle et al. | 585/15 |
| 5,741,758 | * | 4/1998 | Pakulski | 507/90 |
| 5,874,660 | * | 2/1999 | Colle et al. | 585/15 |
| 5,880,319 | * | 3/1999 | Sloan, Jr. | 585/15 |
| 5,900,516 | * | 5/1999 | Talley et al. | 585/15 |
| 5,981,816 | * | 11/1999 | Sinquin et al. | 585/15 |
| 6,028,233 | * | 2/2000 | Colle et al. | 585/15 |

FOREIGN PATENT DOCUMENTS

| | | | |
|---|---|---|---|
| 32 45 666 A1 | 6/1984 | (DE) | C08F/222/04 |
| 0 406 432 A1 | 1/1991 | (EP) | C08F/20/56 |
| 0 505 000 A2 | 9/1992 | (EP) . | |
| 0 516 346 A1 | 12/1992 | (EP) | C08F/8/40 |
| 0 536 950 A1 | 4/1993 | (EP) | E21B/37/06 |
| 0 545 383 A1 | 6/1993 | (EP) | C02F/5/12 |
| 0 629 672 A2 | 12/1994 | (EP) | C09D/157/00 |
| 63-280776 | 11/1988 | (JP) . | |
| 6-212178 | 8/1994 | (JP) . | |
| 88/06405 | 9/1988 | (WO) | A01N/43/06 |
| WO 93/25798 | 12/1993 | (WO) . | |
| WO 94/12761 | 6/1994 | (WO) . | |
| 94/20563 | 9/1994 | (WO) | C08G/69/08 |
| 94/25727 | 11/1994 | (WO) | E21B/37/06 |

* cited by examiner

*Primary Examiner*—Philip Tucker
(74) *Attorney, Agent, or Firm*—Sughrue, Mion, Zinn, Macpeak & Seas, PLLC

(57) ABSTRACT

Disclosed herein are clathrate hydrate inhibitors and the method of inhibiting the formation, agglomeration, and deposition of clathrate hydrate using the inhibitors. The clathrate hydrate inhibitor comprises a macromolecular compound in which 3–15 membered ring pendant is connected to the polymer main chain via a specific spacer group such as homo- or co-polymer of (meth)acryloyl pyrrolidine, pyrrolidinocarbonylethyl (meth)acrylate, 2-oxo-pyrrolidinoethyl (meth)acrylate, glyoxyloyl pyrrolidine, pyrrolidinocarbonyl aspartate.

36 Claims, No Drawings

CLATHRATE HYDRATE INHIBITOR AND METHOD OF INHIBITING THE FORMATION OF CLATHRATE HYDRATES USING IT

TECHNICAL FIELD

The present invention relates to clathrate hydrate inhibitors and a method of inhibiting the formation, agglomeration, and deposition of clathrate hydrates using them. The invention is useful in inhibiting the formation of clathrate hydrates, for example, in pipe lines for production for oil and natural gas and for transporting them, in cooling water circulating in factories, in cooling water for various engines, etc.

BACKGROUND ART

It is known that when aqueous media containing various gaseous molecules of, for example, carbon dioxide and hydrocarbons such as methane, ethane, etc. as dissolved therein are left at a particular temperatures under a particular pressure, they give clathrate hydrates which are crystals where the dissolved gaseous molecules have been trapped in the cages of water molecules. Since such clathrate hydrates are often formed in pipe lines through which oil and natural gas are produced and transported, thereby clogging the pipe lines, they are seriously problematic in safe and continuous operation of plants for oil and natural gas.

Heretofore, in order to inhibit the formation of clathrate hydrates in pipe lines through which oil and natural gas are produced and transported, a large amount of methanol has been added to the pipe lines. However, methanol has extremely high flammability and the harmfulness for human bodies and the environment. In addition, the use of methanol for clathrate hydrate inhibition is also problematic since a part of methanol is lost to the gas phase and at the refinery, it is taken into the propane fraction, and then damages downstream catalysts.

A method of adding large amounts of low-molecular weight substances, such as ethylene glycols, urea and inorganic salts, as clathrate hydrate inhibitors capable of taking the place of methanol to inhibit the precipitation and growth of clathrate hydrates has been proposed. Ethylene glycol or triethylen glycol is sometimes preferred to methanol since it is more easily recovered and does not pollute the gas or condensate (light oil fractions), but they cost more than methanol. Therefore, ethylene glycols can be favorable over methanol only in some cases in which the total production cost is decreased. In addition, such low-molecular weight substances must be added in large amounts, like methanol. Therefore, it was difficult to say that the method is favorable in view of its negative influence on the environment and of the economical aspect. Given the situations, it has been desired to develop other methods of inhibiting the formation of clathrate hydrates for the method of adding methanol and other low-molecular weight substances.

As such other methods of inhibiting the formation of clathrate hydrates for the method of adding methanol and other low-molecular substances, there have recently been proposed various methods of adding water-soluble or water-dispersible macromolecular compounds, such as a method of adding polyethylene glycol or polypropylene glycol (see Japanese Patent Laid-Open No. 6-212178); a method of adding a polyether having cyclic ether structures in its main chain (see EP Laid-Open No. 505000); a method of adding polyvinylpyrrolidone or a copolymer of vinyl pyrrolidinone and $\alpha$-olefins (see International Patent Laid-Open No. WO93/25798); a method of adding a copolymer of vinyl pyrrolidinone, vinyl caprolactam and dimethylaminoethyl methacrylate (see International Patent Laid-Open No. WO94/12761), etc.

The most significant difference between the methods of adding such macromolecular compounds and the methods of adding methanol and other low-molecular weight substances lies in the mechanisms inhibiting the formation of clathrate hydrates. Precisely, large amounts of methanol and other low-molecular weight substances are added to systems by which the formation of clathrate hydrates is completely and thermodynamically inhibited or, that is, the formation is completely inhibited due to the freezing-point depression in the systems. Such additives are referred to as thermodynamic inhibitors. As opposed to these, additives of macromolecular compounds are referred to as kinetic inhibitors, which inhibit not completely the formation of clathrate hydrates but retard and inhibit the formation of clathrate hydrates for a certain period of time or control the crystal systems and the sizes of the clathrate hydrates being formed, thereby inhibiting the clogging of pipe lines for a certain period of time. The macromolecular compounds are characterized in that they can exhibit a high inhibiting effect even when added in much smaller amounts than the low-molecular weight substances.

Of such conventional kinetic inhibitors, however, the ability of polyethylene glycol, polypropylene glycol and polyols having cyclic ether structures in its main chain to retard the formation of clathrate hydrates and to inhibit the growth thereof is extremely poor. The ability of polyvinyl pyrrolidinone and copolymers of vinyl pyrrolidinone and a -olefins to retard the formation of clathrate hydrates and to inhibit the growth thereof is higher than that of polyethylene glycol, polypropylene glycol and polyethers having cyclic ether structures in the main chain but is not satisfactory. The ability of the copolymer of vinyl pyrrolidinone, caprolactam, and dimethylaminoethyl methacrylate, on the other hand, to retard the formation of clathrate hydrates and to inhibit the growth thereof is higher than the other, above mentioned macromolecular compounds, however, its performance is not yet good enough and the conditions under which the polymer is applicable are limited.

DISCLOSURE OF INVENTION

The object of the present invention is to provide a clathrate hydrate inhibitor which is stable in the system that may form clathrate hydrates, and which has the high ability to retard the formation of clathrate hydrates and to inhibit the growth, agglomeration, and deposition thereof.

Another object of the invention is to provide a method of inhibiting the formation of clathrate hydrates, which is stably applicable to the system that may form clathrate hydrates, which is highly effective in retarding the formation of clathrate hydrates and in inhibiting the growth, agglomeration, and deposition thereof and which is cost-effective.

The clathrate hydrate inhibitor in the present invention is a clathrate hydrate inhibitor, which comprises a macromolecular compound (I) comprising a structural unit (1) of the following general formula (1) in the molecule:

(1)

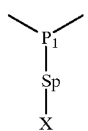

(where $P_1$ represents a macromolecular main chain,

Sp represents a functional group comprises one or more functional groups selected from linear or branched alkyl group having from 1 to 24 carbon atoms in which a part of or all of hydrogen may replaced by halogen atoms or hydroxyl group; carbonyl, ester, carbonate, ether; thioester, thioether; amide, urea, urethane, imine, or those nitrogen containing functional groups in which the hydrogen on the nitrogen atom may replaced by an alkyl group having 1 or 2 carbon atoms, and X represents 3–15 membered ring group.)

The clathrate hydrate inhibitor in the present invention is also a clathrate hydrate inhibitor, which comprises a macromolecular compound (I) comprising both a structural unit (1) and a structural unit (2) of the following general formula (6) in the molecule:

(6)

$P_2$
|
Y (where $P_2$ represents a macromolecular main chain, which may be the same as or different from $P_1$;

Y represents a pendant having a saturated or unsaturated alkyl group with from 8 to 24 carbon atoms or having a phenyl group, which is directly bonded to $P_2$ or is bonded thereto via one or more bonds selected from carbonyl, ester, carbonate, ether; thioester, thioether; amide, urea, urethane, imine, or those nitrogen containing functional groups in which the hydrogen on the nitrogen atom may replaced by an alkyl group having 1 or 2 carbon atoms.)

The clathrate hydrate inhibitor in the present invention is also a clathrate hydrate inhibitor, which comprises a macromolecular compound (I) comprising both a structural unit (1) and a structural unit (3) of the following general formula (10) in the molecule:

(10)

$P_3$
|
Z (where $P_3$ represents a macromolecular main chain, which may be the same as or different from $P_1$;

Z represents a dissociating group and/or a salt thereof, which is directly bonded to $P_3$ or is bonded thereto via one or more bonds selected from carbonyl, ester, carbonate, ether; thioester, thioether; amide, urea, urethane, imine, or those nitrogen containing functional groups in which the hydrogen on the nitrogen atom may replaced by an alkyl group having 1 or 2 carbon atoms.)

It is desirable that the clathrate hydrate inhibitor in the present invention comprises a macromolecular compound (I) comprising all of the structural units (1), (2), and (3).

Another aspect of the present invention is a method of inhibiting the formation of clathrate hydrates by adding the above-mentioned clathrate hydrate inhibitor to a system capable of forming clathrate hydrates.

In carrying out the method, it is desirable that the clathrate hydrate inhibitor is added to a system capable of forming clathrate hydrates, after having been dissolved in water and/or a water-miscible solvent.

It is also desirable, in carrying out the method, that the clathrate hydrate inhibitor is added to a system capable of forming clathrate hydrates, in an amount of from 0.01 to 30 parts by weight relative to 100 parts of the free water existing in the system.

BEST MODE FOR CARRYING OUT THE INVENTION

The clathrate hydrate inhibitor in the present invention is a clathrate hydrate inhibitor, which comprises a macromolecular compound (I) comprising a structural unit (1) of the following general formula (I) in the molecule:

(1)

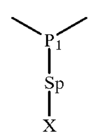

In the general formula (1), $P_1$ represents a macromolecular main chain, which includes substituted and/or unsubstituted hydrocarbon back-bones to be obtained by polymerizing ethylenically unsaturated monomers; polyester back-bones; polyamide back-bones; polyurethane back-bones; polycarbonate back-bones; polyester back-bones; polyether back-bones; polyimide back-bones, etc. $P_1$ may be composed of one or more of these.

In the general formula (1), X represents a 3–15 membered ring group and should be connected to the macromolecular main chain $P_1$ via specific spacer groups, Sp. In the structures represented by the general formula (1), the ring pendant, X, is set away from the macromolecular main chain by such spacer groups. As the result, the pendant is able to move more freely, and to be used more efficiently for clathrate hydrate inhibition than a pendant directly connected to a macromolecular main chain such as polyvinylpyrrolidone and polyvinylcaprolactam.

X includes, for example, nitrogen-containing hetero-ring such as aziridine, azetidine, pyrrolidine, piperidine, piperazine, hexamethyleneimine, imidazole, pyrazole, hydantoin, pipecoline, morpholine, pyrrole, pyrroline, indazole, indole, carbazole, iminodibenzyl, iminostilbene, maleimide, succineimide, phthalimide, pyrrolidinone, caprolactam etc.; oxygen-containing hetero-ring such as, propiolactone, butylolactone, caprolactone, ethylene carbonate, trimethylenecarbonate, epoxy, tetrahydrofuran, dioxolane, dioxane etc.; hydrocarbon ring such as cyclopentane, cyclohexane, benzene etc.; and also derivatives of these rings where one or more hydrogen atoms have been substituted. The macromolecular compound (I) may comprise one or more of these rings. Of these rings, preferred are nitrogen-containing hetero-ring since the ability of the resulting clathrate hydrate inhibitor to inhibit the formation and growth of clathrate hydrates could be high, and more preferred are from 5-membered to 7-membered rings, such as pyrrolidine, piperidine, piperazine, hexamethyleneimine, imidazole, maleimide, pyrrolidinone, caprolactam etc.

It is preferable that X has the following general formula (4):

(4)

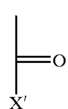

since the ability of such macromolecular compounds (I) to retard the formation of clathrate hydrates and to inhibit the growth thereof is high.

In the general formula (4), X' represents nitrogen-containing, non-aromatic and/or aromatic hetero-ring, and is bonded to the neighboring carbonyl group via its nitrogen atom. X' includes, for example, aziridine, azetidine, pyrrolidine, piperidine, piperazine, hexamethyleneimine, imidazole, pyrazole, hydantoin, pipecoline, morpholine, pyrrole, pyrroline, indazole, indole, carbazole, iminodibenzyl, iminostilbene, maleimide, succineimide, phthalimide, pyrrolidinone, caprolactam; and also derivatives of these rings where one or more hydrogen atoms have been substituted. The macromolecular compound (I) may 1comprise one or more of these rings. Of these rings, preferred are from 5-membered to 7-membered rings, such as pyrrolidine, piperidine, piperazine, hexamethyleneimine, imidazole, maleimide, succineimide, pyrrolidinone, caprolactam, since the ability of the resulting clathrate hydrate inhibitor to inhibit the formation and growth of clathrate hydrates could be high.

It is also preferable that X is lactams such as pyrrolidinone and caprolactam since the ability of such macromolecular compounds (I) to retard the formation of clathrate hydrates and to inhibit the growth thereof is high.

It is preferable that the macromolecular compound (I) is containing at or more than 10 mole % of the structural unit (1) based on the repeating unit of the macromolecular compound, and more preferable that the macromolecular compound (I) is containing at or more than 40 mole % of the structural unit (1). If the compound (I) has less than 10 mole % of the structural unit (1), the ability of the resulting clathrate hydrate inhibitor to inhibit the formation and growth of clathrate hydrates will be often poor.

In the general formula (1). Sp represents a functional group comprises one or more functional groups selected from linear or branched alkyl group having from 1 to 24 carbon atoms in which a Part of or all of hydrogen may replaced by halogen atoms or hydroxyl group; carbonyl, ester, carbonate, ether; thioester, thioether; amide, urea, urethane, imine, or those nitrogen containing functional groups in which the hydrogen on the nitrogen atom may replaced by an alkyl group having 1 or 2 carbon atoms.

The pendant group, —Sp—X, in general formula (1) includes, if pyrrolidine is taken an example of cyclic amines, pyrrolidine ring containing groups such as pyrrolidinocarbonyl-, pyrrolidinocarbonyl alkyl carbonyl-, N-pyrrolidinocarbonyl alkylene carbamoyl-, ω-pyrrolidino-poly(carbonylalkyleneox y)-carbonyl-, ω-pyrrolidino-poly (carbonylalkyleneamino)-carbonyl-, pyrrol idinocarbonylalkylenecarboxy-, pyrrol idinocarbonylalkyleneamido-, ω-pyrrolidinocarbonyl-poly (alkyleneamido)-, ω-pyrrolidinocarbonyl-poly (alkyleneoxy)-; piperidine containing groups such as piperidinocarbonyl-, piperidinocarbonyl alkyl carbonyl-, N-piperidinocarbonyl alkylene carbamoyl-, ω-piperidino-poly(carbonylalkyleneoxy)-carbonyl-, ω-piperidino-poly (carbonylalkyleneamino)-carbonyl-, piperidinocarbonylalkylenecarboxy-, piperidinocarbonylalkyleneamido-, ω-piperidinocarbonyl-poly(alkyleneamido)-, ω-piperidinocarbonyl-poly (alkyleneoxy)-; or if pyrrolidinone is taken an example of lactams, pyrrolidinone ring containing groups such as 2-oxo-pyrrolidinoalkyleneoxycarbonyl-, 2-oxo-pyrrolidinocarbonyl -, N-(2-oxo-pyrrolidinoalkylene)-carbamoyl-, 2-oxo-pyrrolidonoalkylenecarboxy-, 2-oxo-pyrrolidinoalkyleneamido-, ω-(2-oxo-pyrrolidino)-poly (alkyleneamido)-, ω-(2-oxo-pyrrolidino)-carbonyl-poly (alyleneoxy)-.

It is preferable that $P_1$ represents alkyl group which is obtained by polymerizing one or more of ethylenically unsaturated monomers in which hydrogens may be replaced by alkyl group having 1 or 2 carbon atoms or halogen atoms.

It is preferable that the structural unit (1) comprises the following general formulae (2) and/or (3) in the macromolecular compound (I):

(2)

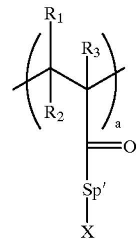

(where $R_1$, $R_2$, and $R_3$ each independently represent a hydrogen atom or an alkyl group having 1 or 2 carbon atoms, Sp' represents a direct bond between the carbonyl carbon adjacent to Sp' on the macromoleular main chain side of Sp' and X or a functional group comprises one or more functional groups selected from linear or branched alkyl group having from 1 to 24 carbon atoms in which a part of or all of hydrogen may replaced by halogen atoms or hydroxyl group; carbonyl; ester, carbonate, thioester, amide, urethane, or those carbonyl-group containing functional groups which may include the carbonyl group adjacent to Sp' on the macromoleular main chain side of Sp', and or those nitrogen containing functional groups in which the hydrogen on the nitrogen atom may replaced by an alkyl group having 1 or 2 carbon atoms; ether; thioether; urea, imine or those nitrogen containing functional groups in which the hydrogen on the nitrogen atom may replaced by an alkyl group having 1 or 2 carbon atoms, X represents 3–15 membered ring group, and a represents an integer of 1 or more.)

(3)

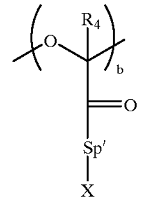

(where $R_4$ represents a hydrogen atom or an alkyl group having 1 or 2 carbon atoms, Sp' represents a direct bond between the carbonyl carbon adjacent to Sp' on the macromoleular main chain side of Sp' and X; or a functional group comprises one or more functional groups selected from linear or branched alkyl group having from 1 to 24 carbon atoms in which a part of or all of hydrogen may replaced by halogen atoms or hydroxyl group; carbonyl; ester, carbonate, thioester, amide, urethane, or those carbonyl-group containing functional groups which may include the carbonyl group adjacent to Sp' on the macromoleular main chain side of Sp', and or those nitrogen containing functional groups in which the hydrogen on the nitrogen atom may replaced by an alkyl group having 1 or 2 carbon atoms; ether; thioether; urea, imine or those nitrogen containing functional groups in which the hydrogen on the nitrogen atom may replaced by an alkyl group having 1 or 2 carbon atoms, X represents 3–15 membered ring group, and b represents an integer of 1 or more.)

It is also preferable that the structural unit (1) comprises the following general formula (5) in the macromolecular compound (I):

(5)

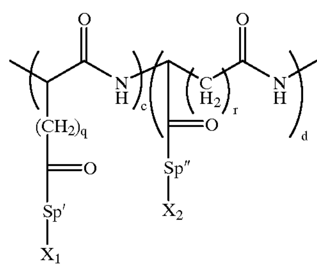

(where Sp' and Sp" each independently represent a direct bond between the carbonyl carbon adjacent to Sp' on the macromoleular main chain side of Sp' and $X_1$ or between the carbonyl carbon adjacent to Sp" on the macromoleular main chain side of Sp" and $X_2$; or a functional group comprises one or more functional groups selected from linear or branched alkyl group having from 1 to 24 carbon atoms in which a part of or all of hydrogen may replaced by halogen atoms or hydroxyl group; carbonyl; ester, carbonate, thioester, amide, urethane, or those carbonyl-group containing functional groups which may include the carbonyl group adjacent to Sp' or Sp" on the macromoleular main chain side of Sp' or Sp", and or those nitrogen containing functional groups in which the hydrogen on the nitrogen atom may replaced by an alkyl group having 1 or 2 carbon atoms; ether; thioether; urea, imine or those nitrogen containing functional groups in which the hydrogen on the nitrogen atom may replaced by an alkyl group having 1 or 2 carbon atoms, $X_1$ and $X_2$ each independently represent 3–15 membered ring group, q and r each represents 1 or 2, and c and d each independently represent an integer of 1 or more.)

In the formula (5), it is preferable that $X_1$ and $X_2$ is the general formula (4). particularly a lactam ring.

The macromolecular compound (I) comprising the structural unit (1) in the molecule can be obtained by, for example, the following methods.

(1) Polymerizing one or more ethylenically unsaturated monomers having —Sp—X group.

The monomers having —Sp—X group can be prepared by reacting a cyclic compound which gives the corresponding structure, —X or a part of —Sp—X, directly to an ethylenically unsaturated monomer having a reactive group capable to react with the cyclic compound, e.g., unsaturated hydrocarbon group, carboxyl group, ester, alcohol, epoxy, amine, amide, oxazoline, thiol, silanol, isocyanate etc. The ethylenically unsaturated monomer includes, for example, butadiene, (meth)acrylic acid, (meth)acrylate, (meth)acrylic acid chloride, grylcidyl (meth)acrylate; (meth)acrylamide; vinyl acetate; allyl alcohol, ally grycidyl ether, allyl amine; isopropenyl oxazoline; maleic acid, fumaric acid, maleic anhydride, and their mono- or di-alkyl esters.

The monomers having —Sp—X group can also be prepared by reacting a precursor having a functional group such as carboxyl group, ester, alcohol, amine at one end and having —X at the other end of itself to an ethylenically unsaturated monomer having a reactive group capable to react with the cyclic compound, e.g., unsaturated hydrocarbon group, carboxyl group, ester, alcohol, epoxy, amine, amide, oxazoline, thiol, silanol, isocyanate etc. The precursor can be prepared by reacting a cyclic compound which gives the corresponding structure, —X or a part of —Sp—X, with lactones, lactams, acid anhydrides, cyclicethers etc.

(2) Modifying a macromolecular compound (A) having a reactive group capable to react with the precursor, e.g., unsaturated hydrocarbon group, carboxyl group, ester, alcohol, epoxy, amine, amide, oxazoline, thiol, silanol, isocyanate isocyanate etc., with the above mentioned precursor which gives the corresponding —Sp—X.

The macromolecular compound (A) having a reactive group includes, for example, (a) (co)polymers prepared by polymerizing one or more unsaturated monomers having a reactive group such as butadiene, (meth)acrylic acid, alkyl(meth) acrylate, (meth)acrylic acid chloride, grylcidyl (meth)acrylate . aminoalkyl(meth)acrylate; (meth)acrylamide, N-alkyl-(meth)acrylamide, N,N-dialkyl-(meth)acrylamide; vinyl acetate; allyl alcohol, ally grycidyl ether, allyl amine; isopropenyl oxazoline; maleic acid, fumaric acid, maleic anhydride, and their mono- or di-alkyl esters.

(b) polyglyoxylic acid, polyglutamic acid, polyaspartic acid and their derivatives in which the pendant carboxyl group may be replaced by ester or amide.

Of the above-mentioned macromolecular compounds (I), the macromolecular compounds (I) having poly(meth) acryloyl structure are preferred since these can easily produced and the ability of such macromolecular compounds (I) to retard the formation of clathrate hydrates and to inhibit the growth thereof is high.

In addition, the macromolecular compounds (I) having polyglyoxyloyl structure or having polyaspartate structure is preferable since not only their ability to retard the formation of clathrate hydrates and to inhibit the growth thereof is high but also they are easily decomposed in the environment when released thereinto after their use.

The clathrate hydrate inhibitor in the present invention is also a clathrate hydrate inhibitor, which comprises a macromolecular compound (I) comprising both a structural unit (1) and a structural unit (2) of the following general formula (6) in the molecule:

(6)

$$-P_2(-Y)-$$

In the general formula (6), $P_2$ represents a macromolecular main chain, which may be the same as or different from Pi.

In the general formula (6),Y represents a pendant having a saturated or unsaturated alkyl group with from 8 to 24 carbon atoms or having a phenyl group, which is directly bonded to $P_2$ or is bonded thereto via one or more bonds selected from carbonyl, ester, carbonate, ether; thioester, thioether; amide, urea, urethane, imine, or those nitrogen containing functional groups in which the hydrogen on the nitrogen atom may replaced by an alkyl group having 1 or 2 carbon atoms.

It is preferable that the content of X is at or more than 40 mole % when the total amount of Group X and Group Y is set 100 mole % since the ability of such macromolecular compounds (I) to retard the formation of clathrate hydrates and to inhibit the growth thereof is high. If the compound (I) has less than 40 mole % of X relative to the total amount of Group X and Group Y, the ability of the resulting clathrate hydrate inhibitor to inhibit the formation and growth, agglomeration, and deposition of clathrate hydrates will be often poor.

Since it is believed that clathrate hydrates mainly form and grow in the interface between water/clathrate hydrate phase and gas/oil phase, the polymer having alkyl pendants will work as a clathrate hydrate inhibitor more efficiently than a polymer without alkyl pendants as the former polymer will be more localised in the interface of clathrate hydrate phase and gas/oil.

It is preferable that $P_2$ is alkyl group which is obtained by polymerizing one or more of ethylenically unsaturated monomers in which hydrogens may be replaced by alkyl group having 1 or 2 carbon atoms or halogen atoms.

It is preferable that the structural unit (2) comprises the following general formulae (7) and/or (8) in the macromolecular compound (I):

(7)

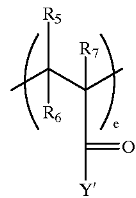

(where $R_5$, $R_6$, and $R_7$ each independently represent a hydrogen atom or an alkyl group having 1 or 2 carbon atoms, Y' represents a pendant having a saturated or unsaturated alkyl group with from 8 to 24 carbon atoms or having a phenyl group, which is directly bonded to the carbonyl carbon adjacent to Y' on the macromolecular main chain side of Y'; or ester, thioester which include the carbonyl group adjacent to Y' on the macromoleular main chain side of Y', or amide which include the carbonyl group adjacent to Y' on the macromoleular main chain side of Y' and in which the hydrogen on the nitrogen atom may replaced by an alkyl group having 1 or 2 carbon atoms; ether; thioether; urea, imine or those nitrogen containing functional groups in which the hydrogen on the nitrogen atom may replaced by an alkyl group having 1 or 2 carbon atoms, and e represents an integer of 1 or more.)

(8)

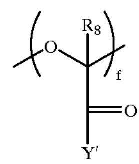

(where $R_8$ represents a hydrogen atom or an alkyl group having 1 or 2 carbon atoms, Y' represents a pendant having a saturated or unsaturated alkyl group with from 8 to 24 carbon atoms or having a phenyl group, which is directly bonded to the carbonyl carbon adjacent to Y' on the macromolecular main chain side of Y'; or ester, thioester which include the carbonyl group adjacent to Y' on the macromoleular main chain side of Y', or amide which include the carbonyl group adjacent to Y' on the macromoleular main chain side of Y' and in which the hydrogen on the nitrogen atom may replaced by an alkyl group having 1 or 2 carbon atoms; ether; thioether; urea, imine or those nitrogen containing functional groups in which the hydrogen on the nitrogen atom may replaced by an alkyl group having 1 or 2 carbon atoms, and f represents an integer of 1 or more.)

It is also preferable that the structural unit (2) comprises the following general formula (9) in the macromolecular compound (I):

(9)

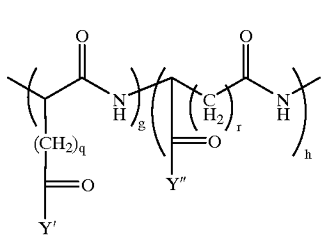

(where Y' and Y" each independently represent a pendant having a saturated or unsaturated alkyl group with from 8 to 24 carbon atoms or having a phenyl group, which is directly bonded to the carbonyl carbon adjacent to Y' or Y' on the macromolecular main chain side of Y' or Y"; or ester, thioester which include the carbonyl group adjacent to Y' on the macromoleular main chain side of Y' or Y", or amide which include the carbonyl group adjacent to Y' or Y" on the macromoleular main chain side of Y' and in which the hydrogen on the nitrogen atom may replaced by an alkyl group having 1 or 2 carbon atoms; ether; thioether; urea, imine or those nitrogen containing functional groups in which the hydrogen on the nitrogen atom may replaced by an alkyl group having 1 or 2 carbon atoms, q and r each represents 1 or 2. and g and h each independently represents an integer of 1 or more.)

The macromolecular compound (I) comprising the structural unit (2) in addition to the structural unit (1) in the molecule can be obtained by, for example, the following methods.

(3) Polymerizing one or more ethylenically unsaturated monomers having —Sp—X group as exemplified in (1) and one or more monomers having Y group, for example, unsaturated hydrocarbons such as 1-decene, 1-dodecene, 1-tetradecene, 1-hexadecene, 1-octadecene, 1-eicosene, etc. ; esters of (meth)acrylic acid with alkyl alcohols such as 1-octanol, 1-nonanol, 1-decanol, 1-dodecanol, 1-tetradecanol, 1-hexadecanol, 1-octadecanol, 1-eicosanol, 1-docosanol, 1-tetracosanol, etc. ; mono- or di-esters of maleic acid or fumaric acid with the above-mentioned alcohols; esters of glyoxylic acid with the above-mentioned alcohols.

(4) Modifying a macromolecular compound (A) as exemplified in (2) having a reactive group capable to react with the precursor and the alcohols, carboxylic acid, or amines having alkyl group of from 8 to 24 carbons with the precursor which gives the corresponding —Sp—X as exemplified in (1) and alcohols. carboxylic acids, or amines having alkyl group of from 8 to 24 carbons.

Of the above-mentioned macromolecular compounds (I), the macromolecular compounds (I) having poly(meth) acryloyl structure are preferred since these can easily produced and the ability of such macromolecular compounds (I) to retard the formation of clathrate hydrates and to inhibit the growth, agglomeration, and deposition thereof is high.

In addition, the macromolecular compounds (I) having polyglyoxyloyl structure or having polyaspartate structure is preferable since not only their ability to retard the formation of clathrate hydrates and to inhibit the growth, agglomeration, and deposition thereof is high but also they are easily decomposed in the environment when released thereinto after their use.

The clathrate hydrate inhibitor in the present invention is also a clathrate hydrate inhibitor, which comprises a macromolecular compound (I) comprising both a structural unit (1) and a structural unit (3) of the following general formula (10) in the molecule:

(10)

$P_3$
|
Z

In the general formula (10), $P_3$ represents a macromolecular main chain, which may be the same as or different from $P_1$.

In the general formula (10), Z represents a dissociating group and/or a salt thereof. The dissociating group and/or a salt thereof, Z, includes, for example, carboxyl group; sulfonic acid group; phosphoric acid group; amino group; mono- or di-alkylamino group substituted by alkyl group(s) having from 1 to 4 carbon atoms; and their salts. One or more of those dissociating groups can be selected. Of the above-mentioned dissociating groups, sulfonic acid group is preferable since the macromolecular compounds (I) comprising sulfonic acid group is stable in the system containing polyvalent ions. Of the above-mentioned dissociating groups, cationic groups are preferable the ability of such macromolecular compounds (I) to retard the formation of clathrate hydrates and to inhibit the growth thereof is high.

It is preferable that the content of X is at or more than 40 mole % when the total amount of Group X and Group Z is set 100 mole % since the ability of such macromolecular compounds (I) to retard the formation of clathrate hydrates and to inhibit the growth thereof is high. If the compound (I) has less than 40 mole % of X relative to the total amount of Group X and Group Z, the ability of the resulting clathrate hydrate inhibitor to inhibit the formation and growth of clathrate hydrates will be often poor.

By introducing such dissociating pendants in the polymer molecule, the solubility of the polymer to the water phase is enhanced and the clouding point of the polymer is usually increased. The clathrate hydrate with a higher clouding point is more preferrable as a clathrate hydrate inhibitor since the temperature and the electrolytes' concentration of the system in which a clathrate hydrate will be used is often high and in such systems, a polymer with a low clouding point tends to precipitate out from the system and become ineffective as a clathrate hydrate inhibitor.

It is preferable that $P_3$ is alkyl group which is obtained by polymerizing one or more of ethylenically unsaturated monomers in which hydrogens may be replaced by alkyl group having 1 or 2 carbon atoms or halogen atoms.

It is preferable that the structural unit (3) comprises the following general formulae (11) and/or (12) in the macromolecular compound (I):

(11)

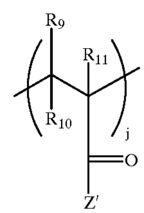

(where $R_8$, $R_{10}$, and $R_{11}$ each independently-represent a hydrogen atom or an alkyl group having 1 or 2 carbon atoms, Z' represents a dissociating group and/or a salt thereof, which is directly bonded to the carbonyl carbon adjacent to Z' on the macromolecular main chain side of Z'; or ester, thioester which include the carbonyl group adjacent to Z' on the macromoleular main chain side of Z', or amide which include the carbonyl group adjacent to Z' on the macromoleular main chain side of Z' and in which the hydrogen on the nitrogen atom may replaced by an alkyl group having 1 or 2 carbon atoms; ether; thioether; urea, imine or those nitrogen containing functional groups in which the hydrogen on the nitrogen atom may replaced by an alkyl group having 1 or 2 carbon atoms, and i represents an integer of 1 or more.)

(12)

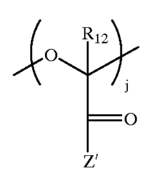

(where $R_{12}$ represents a hydrogen atom or an alkyl group having 1 or 2 carbon atoms, Z' represents a dissociating group and/or a salt thereof, which is directly bonded to the carbonyl carbon adjacent to Z' on the macromolecular main chain side of Z'; or ester, thioester which include the carbonyl group adjacent to Z' on the macromoleular main chain side of Z', or amide which include the carbonyl group adjacent to Z' on the macromoleular main chain side of Z' and in which the hydrogen on the nitrogen atom may replaced by an alkyl group having 1 or 2 carbon atoms; ether; thioether; urea, imine or those nitrogen containing functional groups in which the hydrogen on the nitrogen atom may replaced by an alkyl group having 1 or 2 carbon atoms, and j represents an integer of 1 or more.)

It is also preferable that the structural unit (3) comprises the following general formula (13) in the macromolecular compound (I):

(13)

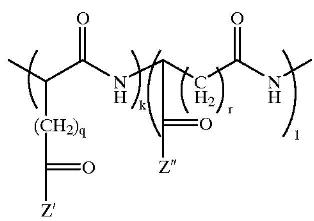

(where Z' and Z" each independently represent a dissociating group and/or a salt thereof, which is directly bonded to the carbonyl carbon adjacent to Z' or Z' on the macromolecular main chain side of Z' or Z"; or ester, thioester which include the carbonyl group adjacent to Z' or Z" on the macromoleular main chain side of Z' or Z", or amide which include the carbonyl vi group adjacent to Z' or Z' on the macromoleular main chain side of Z' or Z' and in which the hydrogen on the nitrogen atom may replaced by an alkyl group having 1 or 2 carbon atoms; ether; thioether; urea, imine or those nitrogen containing functional groups in which the hydrogen on the nitrogen atom may replaced by an alkyl group having 1 or 2 carbon atoms, q and r each represents 1 or 2, and k and l each independently represents an integer of 1 or more.)

The macromolecular compound (I) comprising the structural unit (3) in addition to the structural unit (1) in the molecule can be obtained by, for example, the following methods.

(5) Polymerizing one or more ethylenically unsaturated monomers having —Sp—X group as exemplified in (1) and one or more monomers having dissociating group, for example, (meth)acrylic acid, maleic acid, fumaric acid, styrene sulfonic acid, allyl sulfonic acid, acrylamide-2-methylpropane sulfonic acid, sulfoethyl(meth)acrylate, dimethylaminoethyl(meth)acrylate, dimethylaminopropyl (meth)acrylamide.

(6) Modifying a macromolecular compound (A) as exemplified in (2) having a reactive group capable to react with the precursor which gives the corresponding —Sp—X as exemplified in (1) and alcohols, carboxylic acids, or amines having the corresponding dissociating group include hydroxyl acids such as isethionic acid, glycolic acid, lactic acid, b-hydroxypropionic acid, polycarboxylic acid etc. ; polyacids such as maleic acid, fumaric acid, succinic acid, phthalic acid, maleic anhydride, succinic anhydride, phthalic anhydride etc.; hydroxyl amines such as ethanol amine etc.; polyamines such as ethylene diamine etc.

Of the above-mentioned macromolecular compounds (I), the macromolecular compounds (I) having poly(meth) acryloyl structure are preferred since these can easily produced and the ability of such macromolecular compounds (I) to retard the formation of clathrate hydrates and to inhibit the growth thereof is high.

In addition, the macromolecular compounds (I) having polyglyoxyloyl structure or having polyaspartate structure is preferable since not only their ability to retard the formation of clathrate hydrates and to inhibit the growth thereof is high but also they are easily decomposed in the environment when released thereinto after their use.

It is desirable that the clathrate hydrate inhibitor in the present invention comprises a macromolecular compound (I) comprising all of the structural units (1), (2), and (3).

It is preferable that the content of X is at or more than 40 mole % when the total amount of Group X, Group Y, and Group Z is set 100 mole %, and the content of Y is at or more than 40 mole % when the total amount of Group Y and Group Z is set 100 mole % since the ability of such macromolecular compounds (I) to retard the formation of clathrate hydrates and to inhibit the growth, agglomeration, and deposition thereof is high. If the composition of Group X, Group Y, and Group Z, is not within the above mentioned range, the ability of the resulting clathrate hydrate inhibitor to inhibit the formation and growth of clathrate hydrates will be often poor.

The polymer of the present invention having both alkyl pendants and dissociating pendants is expected to act like a polymeric surfactant, and thus, it localizes in the interface of clathrate hydrate phase and gas/oil phase, inhibits the growth of clathrate hydrates, and prevents agglomeration, and deposition of clathrate hydrate.

The macromolecular compound (I) comprising the structural unit (1), (2), and (3) in the molecule can be obtained by introducing —Sp—X, Y, and Z applying the methods exemplified in (1)–(6).

Of the above-mentioned macromolecular compounds (I), the macromolecular compounds (I) having poly(meth) acryloyl structure are preferred since these can easily produced and the ability of such macromolecular compounds (I) to retard the formation of clathrate hydrates and to inhibit the growth, agglomeration, and deposition thereof is high.

In addition, the macromolecular compounds (I) having polyglyoxyloyl structure or having polyaspartate structure is preferable since not only their ability to retard the formation of clathrate hydrates and to inhibit the growth, agglomeration, and deposition thereof is high but also they are easily decomposed in the environment when released thereinto after their use.

It is preferable that a macromolecular compound (I) comprises the following general formulae (14) and/or (15) in the molecule:

(14)

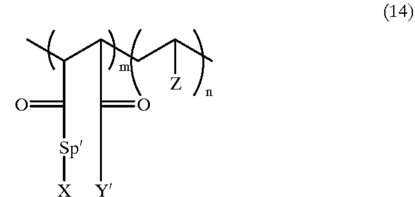

(15)

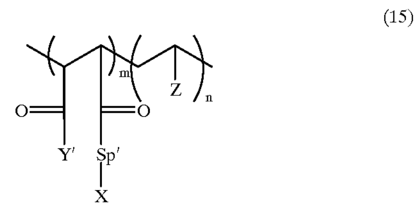

In the general formulae (14) and (15), Sp' represents a direct bond between the carbonyl carbon adjacent to Sp' on the macromoleular main chain side of Sp' and X or —Sp'—C(=O)— represents Sp.

In the general formulae (14) and (15), Y'—C(=O)— represents Y having carbonyl group at the end of itself and having the alkyl group with from 8 to 24 carbon atoms or the phenyl group.

In the general formulae (14) and (15), m and n each independently represent an integer of 1 or more, and m:n falls between 40:60 and 98:2. If the ratio m:n is outside the scope defined herein, the ability of the resulting macromolecular compound (I) to retard the formation of clathrate hydrates and to inhibit the growth, agglomeration, and deposition thereof will often be poor.

It is also preferable that the comprises a macromolecular compound (I) comprising the following general formulae (16) and/or (17) in the molecule:

(16)

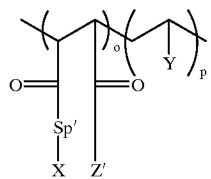

(17)

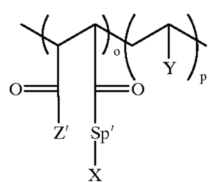

In the general formulae (16) and (17), —Z'—(C═O)— represents Z having carbonyl group at the end of itself.

It is preferable that the repeating unit comprising group Y in the general formulae (16) and (17) is alkene, (meth) acrylate, vinyl ether, or styrene.

In the general formulae (16) and (17), o and p each independently represent an integer of 1 or more, and the ratio o:p falls between 50:50 and 98: 2. If the ratio o:p is outside the scope defined herein, the ability of the resulting macromolecular compound (I) to retard the formation of clathrate hydrates and to inhibit the growth, agglomeration, and deposition thereof will often be poor. The characteristic of the structure of the general formulae (14), (15), (16), and (17) reside in that controled sequences of each functional group, X, Y (or Y'), and Z (or Z') by taking the advantage of reactivity of anhydride and of selective (alternating) polymerization nature of maleic anhydride.

The molecular weight of the macromolecular compound (I) is from 5,000 to 500,000, preferably from 20,000 to 200,000. If the compound (I) has a molecular weight smaller than 5,000, the ability of the resulting clathrate hydrate inhibitor to inhibit the formation and growth, agglomeration, and deposition of clathrate hydrates will be often poor. However, if the compound (I) has a molecular weight larger than 500,000, the viscosity of the system to which the -resulting clathrate hydrate inhibitor is added is extremely increased, or even it will be difficult to add the clathrate hydrate inhibitor to the system capable of forming clathrate hydrates when the resulting clathrate hydrate inhibitor is intended to be added as a solution.

The method of the present invention of inhibiting the formation of clathrate hydrates is carried out by adding the inhibitor to a system capable of forming clathrate hydrates, and the means for the addition are not specifically defined. The clathrate hydrate inhibitor may be directly added to the system by itself or may be added thereto in any form of solution, dispersion or suspension thereof. However, it is preferable to add the clathrate hydrate inhibitor to the system after dissolving the inhibitor to in water and/or a water-miscible solvent since the inhibitor is easily and uniformly diffused to the system and thus, the inhibitor efficiently retard the formation of clathrate hydrates and inhibit the growth, agglomeration, and deposition thereof.

The "system capable of forming clathrate hydrates" as referred to herein indicates a system comprising substances capable of forming clathrate hydrates, as dissolved in an aqueous medium, such as that described in Long, J., Lederhos, A., Sum, A., Christiansen, R., Sloan, E. D. ; Prep. 73rd Ann. GPA Conv., 1994, pp. 1–9. The system of this type shall give clathrate hydrates as precipitated therein, when left under particular pressure and temperature conditions. The substances capable of forming clathrate hydrates include, for example, gases such as carbon dioxide, nitrogen, oxygen, hydrogen sulfide. argon, xenon, ethane, propane, butane, etc., and liquids such as tetrahydrofuran, etc. The aqueous medium in the system includes water as well as aqueous solutions of salt such as saline, seawater, etc. The "system capable of forming clathrate hydrates" as referred to herein also includes systems of suspension or dispersion where an aqueous phase comprising gases such as ethane, propane, etc. as dissolved in an aqueous medium such as water, seawater or the like has been suspended or dispersed in an oil phase comprising liquefied gas, oil or the like and such systems where a gaseous phase comprising natural gas or the like additionally exists in the aqueous phase, such as those in natural gas wells and oil wells.

The amount of the clathrate hydrate inhibitor of the present invention to be added to the system capable of forming clathrate hydrates may be generally from 0.01 to 30 parts by weight relative to 100 parts of the free water existing in the system. If its amount is less than 0.01 parts by weight, the clathrate hydrate inhibitor could not often exhibit sufficiently its effect. On the other hand, even if its amount is more than 30 parts by weight, not only the effect of the inhibitor is often saturated and could no more be enhanced in proportion to the amount of the inhibitor added but also the viscosity of the system to which the inhibitor has been added would often be increased much to thereby noticeably lower the fluidity of the system. For these reasons, such smaller or larger amounts of the clathrate hydrate inhibitor to be added are unfavorable.

If desired, the clathrate hydrate inhibitor of the present invention may contain various additives, such as rust inhibitors, lubricants, dispersing agents, etc.

EXAMPLES

The present invention is described concretely hereinunder by means of the following examples, which, however, are not intended to restrict the scope of the present invention.

<Evaluation Method>

To evaluate the clathrate hydrate inhibitor samples prepared hereinunder, referred to was the method of using multiple reactor screening apparatus as described in Long, J., Lederhos, A., Sum, A., Christiansen, R., Sloan, W. D.; Prep. 73rd Ann. GPA Conv., 1994, pp. 1–9, or the method of using sapphire cell as described in Helland, M. A.; Svartaas, T. M.; Dybvik, L. A. Proc. SPE Annual Technical Conference/Production Operation and Engineerings, 1994, pp. 431–438.

1. Multiple Reactor Screening Method

Concretely, a mixture comprised of 6 ml of a sample solution as prepared by dissolving a sample to be tested in an artificial sea water (for this, referred to was ASTM D1141-90) at a concentration of 0.5% by weight and 2 ml of tetrahydrofuran was put into a test tube of 13 mm×100 mm along with ⅜-inch stainless balls, and the test tube was hermetically sealed in such a way that no air babbles were therein. Then, the test tube was set in a water tank and rotated therein at 0° C. and at a rotation speed of 15 rpm, whereupon the time needed before the stainless balls in the test tube were no more moved at all (ball stop time) was measured. On the basis of the time thus measured, the sample was evaluated. The longer the time, the higher the clathrate hydrate inhibiting effect of the sample tested.

2. High Pressure Sapphire Cell Method

High pressure screening tests were performed in sapphire cells. The sapphire cell was mounted in a cooling bath. The sapphire cell consists of a sapphire tube enclosed in a holder between two stainless steel end pieces. The cell has an inner diameter of 20 mm, height 100 mm and a wall thickness of 20 mm, 15 mm of the top piece and 13 mm of the bottom piece protrudes into the cell, and the total volume between the top and bottom end pieces is 22.6 ml. The sapphire cell is equipped with a stirrer mechanism. A stirrer blade is connected to a magnet housed inside the bottom end piece via an axle. An outer rotating magnetic field created by a laboratory stirrer bar drive is used to regulate the stirrer speed. The stirrer motor can be regulated to maintain a To constant speed (independent of motor load) in the range 0 to ca. 1700 rpm. The regulator/amplifier unit has output connections for both torque and rotation speed readings. The stirrer speed readings were calibrated using a stroboscope.

The sapphire cell was placed inside separate double-walled, transparent carbonate plastic cylinders with four separate windows at 0, 90. 180 and 270° for visual observations. Temperature control of the cell was obtained by circulating water in the plastic cylinders. The cell system is equipped with two temperature sensors for measurement of the temperature inside the cell (in the gas phase) and in the water bath. Pressure was measured with pressure transducer through the inlet tubing connection in the top end piece of the cell.

The temperature was measured with an accuracy of ±0.1° C. and the pressure was measured with an accuracy of ±0.2 bara. Video recordings of the experiments were also made.

Experimental Procedure

The same procedure for preparation of the experiment and filling of the cell was followed in all tests . All tests were performed on new and fresh Synthetic Sea Water (SSW=3.6%) and Synthetic Natural Gas (SNG) at ca. 7.5° C. and ca. 87 bar. A description of this procedure is as follows:

1) The sample to be tested was dissolved in SSW at the concentration of 5000 ppm.
2) The magnet housing of the cell was filled with the sample solution. The magnet housing was then mounted in the bottom end piece of the cell, which thereafter was attached to the sapphire tube and the cell holder.
3) The desired amount of the aqueous solution containing dissolved inhibitor was filled in the cell (above the cell bottom) using a pipette, the top end piece was mounted, and the cell was placed into the cooling bath (plastic cylinder).
4) The temperature of the cooling bath was adjusted to 2–3° C. outside the hydrate region at the pressure conditions to be used in the experiment.
5) Prior to loading the cell with hydrocarbon gas or condensate it was purged two times with the SNG used in the experimental hydrocarbon fluid.
6) The data logging and video recording were started, and the cell was loaded with the hydrocarbon fluid (SNG) to the desired pressure while stirring at 700 rpm. When the temperature and pressure in the cell had stabilized the experiment was started.
7) Experiments were conducted at constant temperature. Once the temperature and pressure had stabilized after loading of the cell, the stirring was stopped. The closed cell was then cooled down to the experimental temperature (ca. 7.5° C.), resulting in a decrease in pressure (to ca. 87 bar). When the temperature and pressure again had stabilized stirring at 700 rpm was started. The induction time for hydrate formation was measured from the time when stirring was started at the experimental temperature, Ts.
8) Between experiments, the cell is dismounted and rinsed thoroughly in cold tap water, and then the cell is rinsed thoroughly with acetone and tap water in turn. Thereafter, it is washed using a detergent, rinsed thoroughly in tap water and then in distilled water, before it is dried by blowing high pressure air at it's surface. If any sort of "coating" of the sapphire glass is observed after an experiment the sapphire tube is washed using two different washing detergents. The inlet tubing of the cell is first dried by blowing high pressure air through it. Then, it is rinsed with acetone, dried with high pressure air, rinsed with distilled water and finally dried by using high pressure air.

Analysis

The results of the experiments were analyzed by plotting the temperature and pressure, or the Total Gas Consumption (TGC) as a function of time. Temperature and pressure data were taken directly from the recorded data file, while the TGC data were obtained by converting the pressure data to give the total gas consumption as a function of time.

The TGC graph is corrected for the pressure loss due to the cooling of the cell and is therefore a direct measure of the total amount of gas bound in the hydrate phase. Plotted against time, the TGC starts to increase at the point of onset of hydrate formation, $t_0$. Hence, the TGC-plot gives a good measure of the hydrate onset time. The corresponding temperature and pressure data can then be found from the data file. The time of start of the autocatalytic growth stage, $t_a$ was found as the point where a sudden and large increase in TGC was observed.

The clathrate hydrate inhibition effect of the sample was evaluated by comparing the period of the slow growth phase, St-1 which equals to $t_a - t_0$. The longer the time, the higher the clathrate hydrate inhibiting effect of the sample tested.

<Preparation of acryloyl pyrrolidine>

100.00 g of acrylic acid chloride, 111.80 g of triethylamine, 100 ml of dichloromethane, and 0.1 g of phenothiazine were put into a 1-L four-neck flask equipped with a stirrer, a condenser, a thermometer, a nitrogen-introducing tube, and an addition funnel charged with 77.46 g of pyrrolidine and 100 ml of dichloromethane.

The content in the funnel was added, dropwise, to the flask with maintaining the flask-internal temperature below 15° C., for 1 hour. Then, the flask was sat at room temperature for 4 hours.

After filtering triethylamine-hydrochloride and evaporating dichloromethane off by rotary-evaporation at 50 mmHg-40° C., the resulting liquid was charged to a 500-ml flask equipped with vacuum distillation apparatus, and vacuum-distilled at 8 mmHg and 120° C. of the bottom temperature. 96.1 g of acryloyl pyrrolidine was obtained.

<Preparation of Acryloyl Piperidine>

100.00 g of acrylic acid chloride, 111.80 g of triethylamine, 100 ml of 2-butanone, and 0.1 g of phenothiazine were put into a 1-L four-neck flask equipped with a stirrer, a condenser, a thermometer, a nitrogen-introducing tube, and an addition funnel charged with 92.74 g of piperidine and 100 ml of 2-butanone. The content in the funnel was added, dropwise, to the flask with maintaining the flask-internal temperature below 15° C., for 1 hour. Then, the flask was sat at room temperature for 4 hours.

After filtering triethylamine-hydrochloride and evaporating 2-butanone off by rotary-evaporation at 50 mmHg-40° C., the resulting liquid was charged to a 500-ml flask equipped with vacuum distillation apparatus, and vacuum-distilled at 5 mmHg and 150° C. of the bottom temperature. 86.0 g of acryloyl piperidine was obtained.

<Preparation of pyrrolidinocarbonyl-ethyl acrylate>

71.12 g of pyrrolidine and 206.20 g of β-hydroxy-methylpropionate were mixed in a 500 ml four-neck flask equipped with a stirrer, a condenser, a thermometer, a nitrogen-introducing tube, and sat for over night.

Excess pyrrolidine was removed by rotally-evapolation at 10 mmHg-100° C.

250 g of crude hydroxyethylcarbonylpyrrolidine was obtained.

100.00 g of acrylic acid chloride, 111.80 g of triethylamine, 100 ml of dichloromethane, and 0.1 g of phenothiazine were put into a 1-L four-neck flask equipped with a stirrer, a condenser, a thermometer, a nitrogen-introducing tube, and an addition funnel charged with 156.62 g of thus-obtained hydroxyethylcarbonylpyrrolidine and 150 ml of dichloromethane.

The content in the funnel was added, dropwise, to the flask with maintaining the flask-internal temperature below 15° C., for 1 hour. Then, the flask was sat at room temperature for 4 hours.

After filtering triethylamine-hydrochloride and evaporating dichloromethane off by rotary-evaporation at 10 mmHg-50° C.

250 g of crude pyrrolidinocarbonyl-ethyl acrylate was obtained.

<Preparation of pyrrolidinocarbonyl-propyl acrylate>

51.00 g of pyrrolidine, 0.01 g of phenothiazine, and 50 ml of de-ionized water were put into a 300 ml four-neck flask equipped with a stirrer, a condenser, a thermometer, a nitrogen-introducing tube, and an addition funnel charged with 70.38 g of g-butylolacton.

The content in the funnel was added, dropwise, to the flask with maintaining the flask-internal temperature below 40° C., for 1 hour. Then, the flask was sat at room temperature over night.

Excess pyrrolidine and water were removed by rotally-evapolation at 10 mmHg-100° C.

100.5 g of crude hydroxypropylcarbonylpyrrolidine was obtained.

27.77 g of acrylic acid, 30.34 g of the thus-obtained hydroxypropylcarbonylpyrrolidine, 2.63 g of p-toluene sulfonic acid, 10 ml of cyclohexane, and 0.03 g of phenothiazine were put into a 100-ml four-neck flask equipped with a stirrer, a condenser, a thermometer, and a distilling trap filled with cyclohexane. The flask was heated to 120° C. and maintained at 120° C. for 8 hrs.

Excess acrylic acid and cyclohexane was removed by rotally-evapolation at 10 mmHg-100° C.

40.7 g of crude pyrrolidinocarbonyl-propyl acrylate was obtained.

<Preparation of 2-oxo-pyrrolidino-ethyl acrylate>

27.77 g of acrylic acid, 24.88 g of hydroxyethylpyrrolidinone, 2.63 g of p-toluene sulfonic acid, 10 ml of cyclohexane, and 0.03 g of phenothiazine were put into a 100-ml four-neck flask equipped with a stirrer, a condenser, a thermometer, and a distilling trap filled with cyclohexane.

The flask was heated to 120° C. and maintained at 120° C. for 8 hrs.

Excess acrylic acid and cyclohexane was removed by rotally-evapolation at 10 mmHg-100° C.

35.3 g of crude 2-oxo-pyrrolidino-ethyl acrylate was obtained.

Example 1

30 g of the thus-obtained acryloylpyrrolidine and 30 ml of 2-butanone were put into a 100-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 60° C., in which the solution in the flask was heated up to 60° C. After the temperature of the solution was stabilized at 60° C., 1 ml of 10 wt. %-solution of a radical polymerization initiator, 2,2-azobis(2,4-dimethylvaleronitrile) (V-65, obtained from Wako Pure Chemicals Co.) in 2-butanone was added to the solution while stirring it.

Having been reacted for 30 min after the addition of the initiator, the bath temperature raised to 85° C. and maintained for 4 hours. The resulting solution was dried in a vacuum oven at 10 mmHg-100° C. for over night, and thus was obtained a clathrate hydrate inhibitor sample (1).

The sample (1) was evaluated in accordance with the above-mentioned tests, which revealed that the ball stop time of was over 144 hours or more, and the slow growth period, St-1, was 578 min.

Example 2

27.0 g of the thus-obtained acryloylpyrrolidine, 3.89 of N,N-dimethylaminoethyl acrylate, and 30 ml of 2-butanone were put into a 100-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 60° C., in which the solution in the flask was heated up to 60° C. After the temperature of the solution was stabilized at 60° C., 1 ml of 10 wt. %-solution of a radical polymerization initiator, 2,2-azobis(2,4-dimethylvaleronitrile) (V-65, obtained from Wako Pure Chemicals Co.) in 2-butanone was added to the solution while stirring it.

Having been reacted for 30 min after the addition of the initiator, the bath temperature raised to 85° C. and maintained for 4 hours. The resulting solution was dried in a vacuum oven at 10 mmHg-100° C. for over night, and thus was obtained a clathrate hydrate inhibitor sample (2).

The sample (2) was evaluated in accordance with the above-mentioned Multiple Reactor Screening Method, which revealed that the ball stop time for this was over 144 hours or more.

Example 3

24.0 g of the thus-obtained acryloylpyrrolidine, 12.2 g of 37 wt. %-sodium acrylate aqueous solution, and 52 g of de-ionized water were put into a 200-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 60° C., in which the solution in the flask was heated up to 60° C. After the temperature of the solution was stabilized at 60° C., 1 ml of 10 wt. %-solution of a radical polymerization initiator, 2,2'-azobis(2,4-dimethylpropionamidine)dihydrochloride (V-50, obtained from Wako Pure Chemicals Co.) in de-ionized water was added to the solution while stirring it.

The bath temperature maintained at 60° C. for 4 hours. The resulting solution was dried in a vacuum oven at 10 mmHg-120° C. for over night, and thus was obtained a clathrate hydrate inhibitor sample (3).

The sample (3) was evaluated in accordance with the above-mentioned tests, which revealed that the ball stop time of was over 144 hours or more, and the slow growth period, St-1, was 125 min.

Example 4

26.7 g of the thus-obtained acryloylpiperidine, 9.9 g of acrylamido-2-methyl-1-propanesulfonic acid, and 30 ml of dimethyl sulfoxide were put into a 100-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 60° C., in which the solution in the flask was heated up to 60° C. After the temperature of the solution was stabilized at 60° C., 1 ml of 10 wt. %-solution of a radical polymerization initiator, 2,2-azobis(2,4-dimethylvaleronitrile) (V-65, obtained from Wako Pure Chemicals Co.) in dimethyl sulfoxide was added to the solution while stirring it.

Having been reacted for 30 min after the-addition of the initiator, the bath temperature raised to 85° C. and maintained for 4 hours. The resulting solution was dried in a vacuum oven at 10 mmHg-150° C. for over night, and thus was obtained a clathrate hydrate inhibitor sample (4).

Since the sample (4) was not completely soluble to SSW at 5000 ppm, the sample solution for Multiple Reactor Screening Method was prepared by dissolving 0.09 g of the sample to the mixture of 18 ml SSW and 6 ml THF, and the thus-obtained solution was filled to the test tubes. For High Pressure Sapphire Cell Method, the supernatant which was prepared by mixing a certain weight of the sample to SSW assuming the sample is soluble to SSW at 5000 ppm was filled to the sapphire cell.

The ball stop time was over 144 hours or more, and the slow growth period, St-1, was 58 min.

Example 5

26.7 g of the thus-obtained acryloylpiperidine, 6.9 g of dimethylaminoethyl acrylate, and 30 ml of 2-butanone were put into a 100-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 60° C., in which the solution in the flask was heated up to 60° C. After the temperature of the solution was stabilized at 60° C., 1 ml of 10 wt. %-solution of a radical polymerization initiator, 2,2-azobis(2,4-dimethylvaleronitrile) (V-65, obtained from Wako Pure Chemicals Co.) in 2-butanone was added to the solution while stirring it.

Having been reacted for 30 min after the addition of the initiator, the bath temperature raised to 85° C. and maintained for 4 hours. The resulting solution was dried in a vacuum oven at 10 mmHg-100° C. for over night, and thus was obtained a clathrate hydrate inhibitor sample (5).

Since the sample (5) was not completely soluble to SSW at 5000 ppm, the sample solution for Multiple Reactor Screening Method was prepared by dissolving 0.09 g of the sample to the mixture of 18 ml SSW and 6 ml THF, and the thus-obtained solution was filled to the test tubes. For High Pressure Sapphire Cell Method, the supernatant which was prepared by mixing a certain weight of the sample to SSW assuming the sample is soluble to SSW at 5000 ppm was filled to the sapphire cell.

The ball stop time was over 144 hours or more, and the slow growth period, St-1, was 92 min.

Example 6

16.7 g of the thus-obtained acryloylpiperidine, 16.9 g of acryloylmorphorine, and 30 ml of 2-butanone were put into a 100-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 60° C., in which the solution in the flask was heated up to 60° C. After the temperature of the solution was stabilized at 60° C., 1 ml of 10 wt. %-solution of a radical polymerization initiator, 2,2-azobis(2,4-dimethylvaleronitrile) (V-65, obtained from Wako Pure Chemicals Co.) in 2-butanone was added to the solution while stirring it.

Having been reacted for 30 min after the addition of the initiator, the bath temperature raised to 85° C. and maintained for 4 hours. The resulting solution was dried in a vacuum oven at 10 mmHg-100° C. for over night, and thus was obtained a clathrate hydrate inhibitor sample (6).

Since the sample (6) was not completely soluble to SSW at 5000 ppm, the sample solution for Multiple Reactor Screening Method was prepared by dissolving 0.09 g of the sample to the mixture of 18 ml SSW and 6 ml THF, and the thus-obtained solution was filled to the test tubes.

The ball stop time was over 144 hours or more.

Example 7

30.0 g of the thus-obtained pyrrolidinocarbonylethyl acrylate and 30 ml of 2-butanone were put into a 100-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 60° C., in which the solution in the flask was heated up to 60° C. After the temperature of the solution was stabilized at 60° C., 1 ml of 10 wt. %-solution of a radical polymerization initiator, 2,2-azobis(2,4-dimethylvaleronitrile) (V-65, obtained from Wako Pure Chemicals Co.) in 2-butanone was added to the solution while stirring it.

Having been reacted for 30 min after the addition of the initiator, the bath temperature raised to 85° C. and maintained for 4 hours. The resulting solution was dried in a vacuum oven at 10 mmHg-100° C. for over night, and thus was obtained a clathrate hydrate inhibitor sample (7).

The sample (7) was evaluated in accordance with the above-mentioned tests, which revealed that the ball stop time of was 2 hours or more, and the slow growth period, St-1, was 58 min.

Example 8

20.0 g of the thus-obtained 2-oxo-pyrrolidinoethylacrylate and 30.0 g of de-ionized water were put into a 100-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 60° C., in which the solution in the flask was heated up to 60° C. After the temperature of the solution was stabilized at 60° C., 1 ml of 10 wt. %-solution of a radical polymerization initiator, 2,2'-azobis(2,4-dimethylpropionamidine)dihydrochloride (V-50, obtained from Wako Pure Chemicals Co.) in de-ionized water was added to the solution while stirring it.

The bath temperature was maintained at 60° C. for 4 hours. The resulting solution was dried in a vacuum oven at 10 mmHg-120° C. for over night, and thus was obtained a clathrate hydrate inhibitor sample (8).

Since the sample (8) was not completely soluble to SSW at 5000 ppm, the sample solution for Multiple Reactor Screening Method was prepared by dissolving 0.09 g of the sample to the mixture of 18 ml SSW and 6 ml THF, and the thus-obtained solution was filled to the test tubes.

The ball stop time was over 144 hours or more.

Example 9

30.0 g of acryloyl morphorine and 30 ml of 2-butanone were put into a 100-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 60° C., in which the solution in the flask was heated up to 60° C. After the temperature of the solution was stabilized at 60° C., 1 ml of 10 wt. %-solution of a radical polymerization initiator, 2,2-azobis(2,4-dimethylvaleronitrile) (V-65, obtained from Wako Pure Chemicals Co.) in 2-butanone was added to the solution while stirring it.

Having been reacted for 30 min after the addition of the initiator, the bath temperature raised to 85° C. and maintained for 4 hours. The resulting solution was dried in a vacuum oven at 10 mmHg-100° C. for over night, and thus was obtained a clathrate hydrate inhibitor sample (9).

The sample (9) was evaluated in accordance with the above-mentioned High Pressure Sapphire Cell Method, which revealed that the slow growth period, St-1, was 45 min.

Example 10

Methyl glyoxylate was polymerized in accordance with the method described in U.S. Pat. No. 4,201,858 to obtain polymethyl glyoxylate.

10.00 g of the thus-obtained polymethyl glyoxylate and 30.00 g of dioxane were put into a 100-ml four-neck flask equipped with a stirrer, a condenser, a thermometer, a nitrogen gas-introducing tube and a addition funnel, where polymethyl glyoxylate was dissolved in dioxane.

Next, a solution of 7.40 g of pyrrolidine as dissolved in 15.00 g of dioxane was dropped into the reaction system over a period of 30 minutes, while the temperature of the system was kept at 25° C. or lower.

After the addition, the compounds were reacted for further 2 hours, and the resulting reaction mixture was poured into diethyl ether to re-precipitate and purify it. Thus was obtained a clathrate hydrate inhibitor sample (10).

The sample (10) was evaluated in accordance with the above-mentioned tests, which revealed that the ball stop time of was 120 hours or more, and the slow growth period, St-1, was 108 min.

Example 11

Methyl glyoxylate was polymerized in accordance with the method described in U.S. Pat. No. 4,201,858 to obtain polymethyl glyoxylate.

10.00 g of the thus-obtained polymethyl glyoxylate and 30.00 g of dioxane were put into a 100-ml four-neck flask equipped with a stirrer, a condenser, a thermometer, a nitrogen gas-introducing tube and a addition funnel, where polymethyl glyoxylate was dissolved in dioxane.

Next, a solution of 7.28 g of pyrrolidine and 1.46 g of 2-ethyl hexyl amine as dissolved in 15.00 g of dioxane was dropped into the reaction system over a period of 30 minutes, while the temperature of the system was kept at 25° C. or lower.

After the addition, the compounds were reacted for further 2 hours, and the resulting reaction mixture was poured into diethyl ether to re-precipitate and purify it. Thus was obtained a clathrate hydrate inhibitor sample (11).

Since the sample (11) was not completely soluble to SSW at 5000 ppm, the sample solution for Multiple Reactor Screening Method was prepared by dissolving 0.09 g of the sample to the mixture of 18 ml SSW and 6 ml THF, and the thus-obtained solution was filled to the test tubes. For High Pressure Sapphire Cell Method, the supernatant which was prepared by mixing a certain weight of the sample to SSW assuming the sample is soluble to SSW at 5000 ppm was filled to the sapphire cell.

The ball stop time was over 144 hours or more, and the slow growth period, St-1, was 106 min.

Example 12

Methyl glyoxylate was polymerized in accordance with the method described in U.S. Pat. No. 4,201,858 to obtain polymethyl glyoxylate.

10.00 g of the thus-obtained polymethyl glyoxylate and 30.00 g of dioxane were put into a 100-ml four-neck flask equipped with a stirrer, a condenser, a thermometer, a nitrogen gas-introducing tube and a addition funnel, where polymethyl glyoxylate was dissolved in dioxane.

Next, a solution of 7.28 g of pyrrolidine and 3.05 g of stearyl amine as dissolved in 15.00 g of dioxane was dropped into the reaction system over a period of 30 minutes, while the temperature of the system was kept at 25° C. or lower.

After the addition, the compounds were reacted for further 2 hours, and the resulting reaction mixture was poured into diethyl ether to re-precipitate and purify it. Thus was obtained a clathrate hydrate inhibitor sample (12).

Since the sample (12) was not completely soluble to SSW at 5000 ppm, the sample solution for Multiple Reactor Screening Method was prepared by dissolving 0.09 g of the sample to the mixture of 18 ml SSW and 6 ml THF, and the thus-obtained solution was filled to the test tubes.

The ball stop time was over 144 hours or more.

Example 13

100.00 g of L-aspartic acid and 50.00 g of 85 wt. %-phosphoric acid were put into a 300-ml three-neck flask equipped with a stirrer, a thermometer and a nitrogen-introducing tube and reacted at 200° C. for 5 hours. After this, the flask was cooled to room temperature, and its content was poured into one liter of ion-exchanged water, stirred for 1 hour and then filtered under suction to obtain polysuccinimide. The thus-obtained polysuccinimide was dried at 80° C. under reduced pressure for 8 hours.

Next, 48.5 g of the thus-obtained polysuccinimide and 200 g of dimethylformamide were put into a 500-ml four-neck flask equipped with a stirrer, a condenser, a thermometer, a nitrogen-introducing tube and a addition funnel, where polysuccinimide was dissolved in dimethylformamide.

Next, 42.70 g of pyrrolidine was dropwise added thereto at room temperature over a period of 30 minutes.

After the addition, the compounds were reacted for further 2 hours at room temperature, and the resulting reaction mixture was poured into diethyl ether to re-precipitate and purify it. Thus was obtained a clathrate hydrate inhibitor sample (13).

The sample (13) was evaluated in accordance with the above-mentioned High Pressure Sapphire Cell Method, which revealed that the slow growth period, St-l, was 57 min.

Example 14

10.0 g of maleic anhydride, 28.0 g of 1-eicosene, and 30 ml of dimethyl sulfoxide were put into a 100-ml four-neck flask equipped with a stirrer, a condenser, a thermometer and a nitrogen-introducing tube.

Next, the tip of the nitrogen-introducing tube was put into the solution, through which nitrogen was bubbled thereinto for 10 minutes to purge away the dissolved oxygen from the system. After this, the tip of the nitrogen-introducing tube was drawn up above the liquid surface.

Next, the flask was put into an oil bath at 80° C., in which the solution in the flask was heated up to 80° C. After the temperature of the solution was stabilized at 80° C., 1 ml of benzoyl peroxide was added to the solution while stirring it.

Having been reacted for 30 min after the addition of the initiator, the bath temperature raised to 90° C. and maintained for 12 hours.

After cooling the solution to room temperature, 15.0 g of pyrrolidine was added to the solution. Then, the resulting solution was dried in a vacuum oven at 10 mmHg-150° C. for over night, and thus was obtained a clathrate hydrate inhibitor sample (14).

The sample (14) was evaluated in accordance with the above-mentioned High Pressure Sapphire Cell Method, which revealed that the slow growth period, St-1, was 36 min.

Comparative Example 1

Synthetic sea water itself was evaluated in accordance with the above-mentioned tests, which revealed that the ball stop time of was less than 10 mi, and the slow growth period, St-1, was less than 1 min.

Comparative Example 2

Polyvinyl pyrrolidone (P.V.P. K-120, obtained from Gokyo Sangyo Co.) was directly used by itself and evaluated in accordance with the above-mentioned Multiple Reactor Screening Method, which revealed that the ball stop time for this was 12 hours.

Comparative Example 3

Vinyl pyrrolidone-1-butene copolymer (ANTARKN® P-904, obtained from ISP Japan, Co.) was directly used by itself and evaluated in accordance with the above-mentioned Multiple Reactor Screening Method, which revealed that the ball stop time for this was 24 hours.

Industrial Applicability

The present invention is useful in inhibiting the formation of clathrate hydrates, for example, in pipe lines for production for oil and natural gas and for transporting them, in cooling water circulating in factories, in cooling water for various engines, etc. The clathrate hydrates inhibitor of the present invention is stable in the system that may form clathrate hydrates, and has the high ability to retard the formation of clathrate hydrates and to inhibit the growth, agglomeration, and deposition thereof.

What is claimed is:

1. A method of inhibiting the formation of clathrate hydrates, which comprises adding a clathrate hydrate inhibitor to a system capable of forming clathrate hydrates, which clathrate hydrate inhibitor comprises a macromolecular compound (I) comprising a structural unit (1) of the following general formula (2) in the molecule:

(2)

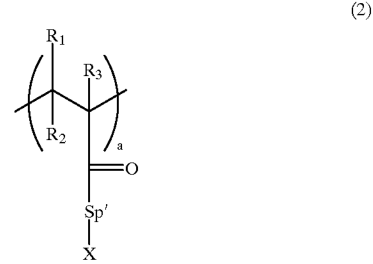

where $R_1$, $R_2$, and $R_3$ each independently represent a hydrogen atom or an alkyl group having 1 or 2 carbon atoms, Sp' represents a functional group comprising one or more functional groups selected from linear or branched alkyl groups having from 1 to 24 carbon atoms in which one or more hydrogen atoms may be replaced by halogen atoms or hydroxyl groups, carbonyl, ester, carbonate, thioester, amide, urethane, or carbonyl-group containing functional groups which may include the carbonyl group adjacent to Sp' on the macromolecular main chain side of Sp', or nitrogen containing functional groups in which the hydrogen on the nitrogen atom may be replaced by an alkyl group having 1 or 2 carbon atoms, ether, thioether, urea or imine, X represents a nitrogen-containing 3–15 membered ring group, and a represents an integer of 1 or more.

2. A method of inhibiting the formation of clathrate hydrates, which comprises adding a clathrate hydrate inhibitor to a system capable of forming clathrate hydrates, which clathrate hydrate inhibitor comprises a macromolecular compound (I) comprising a structural unit (1) comprising a group of the following general formula (3):

(3)

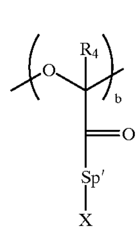

where $R_4$ represents a hydrogen atom or an alkyl group having 1 or 2 carbon atoms, Sp' represents a direct bond between the carbonyl carbon adjacent to Sp' on the macromolecular main chain side of Sp' and X; or a functional group comprising one or more functional groups selected from linear or branched alkyl groups having from 1 to 24 carbon atoms in which one or more hydrogen atoms may be replaced by halogen atoms or hydroxyl groups, carbonyl, ester, carbonate, thioester, amide, urethane, or carbonyl-group containing functional groups which may include the carbonyl group adjacent to Sp' on the macromolecular main chain side of Sp', or nitrogen containing functional groups in which the hydrogen on the nitrogen atom may be replaced by an alkyl group having 1 or 2 carbon atoms, ether, thioether, urea or imine, X represents a 3–15 membered ring group, and b represents an integer of 1 or more.

3. A method of inhibiting the formation of clathrate hydrates as claimed in claim 1, wherein X in the structural unit (1) is a lactam ring.

4. A method of inhibiting the formation of clathrate hydrates, which comprises adding a clathrate hydrate inhibitor to a system capable of forming clathrate hydrates, which clathrate hydrate inhibitor comprises a macromolecular compound (I) comprising a structural unit (1) comprising a group of the following general formula (5):

(5)

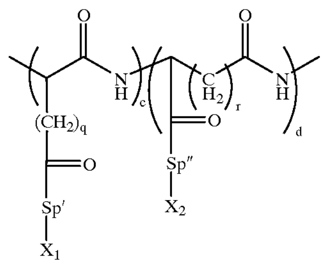

where Sp' and Sp" each independently represent a direct bond between the carbonyl carbon adjacent to Sp' on the macromolecular main chain side of Sp' and $X_1$ or between the carbonyl carbon adjacent to Sp" on the macromolecular main chain side of Sp" and $X_2$; or a functional group comprising one or more functional groups selected from linear or branched alkyl groups having from 1 to 24 carbon atoms in which one or more hydrogen atoms may be replaced by halogen atoms or hydroxyl groups, carbonyl, ester, carbonate, thioester, amide, urethane, or carbonyl-group containing functional groups which may include the carbonyl group adjacent to Sp' or Sp" on the macromolecular main chain said of Sp' or Sp" or nitrogen containing functional groups in which the hydrogen on the nitrogen atom may be replaced by an alkyl group having 1 or 2 carbon atoms, ether, thioether, urea or imine, $X_1$ and $X_2$ each independently represent a 3–15 membered ring group, q and r each represents 1 or 2, and c and d each independently represent an integer of 1 or more.

5. A method of inhibiting the formation of clathrate hydrates as claimed in claim 4, wherein at least one of $X_1$ and $X_2$ in the structural unit (1) is a lactam ring.

6. A method of inhibiting the formation of clathrate hydrates as claimed in claim 1, wherein the macromolecular compound (1) comprises a structural unit (1) and a structural unit (2) of the following general formula (6) in the molecule:

(6)

$$\begin{array}{c} \diagdown \ \diagup \\ P_2 \\ | \\ Y \end{array}$$

where $P_2$ represents a macromolecular main chain,

Y represents a pendant group, having a saturated or unsaturated alkyl group with from 8 to 24 carbon atoms or having a phenyl group, which is directly bonded to $P_2$ or is bonded thereto via one or more bonds selected from carbonyl, ester, carbonate, ether, thioester, thioether, amide, urea, urethane, imine, or nitrogen containing functional groups in which the hydrogen on the nitrogen atom may be replaced by an alkyl group having 1 or 2 carbon atoms.

7. A method of inhibiting the formation of clathrate hydrates as claimed in claim 6, wherein the content of X is at or more than 40 mole % when the total amount of Group X and Group Y is 100 mole %.

8. A method of inhibiting the formation of clathrate hydrates as claimed in claim 6, wherein $P_2$ in the structural unit (2) is an alkyl group which is obtained by polymerizing one or more ethylenically unsaturated monomers in which hydrogens may be replaced by alkyl groups having 1 or 2 carbon atoms or halogen atoms.

9. A method of inhibiting the formation of clathrate hydrates as claimed in claim 6, wherein the structural unit (2) comprises a group of the following general formula (7):

(7)

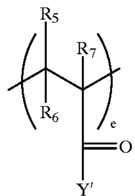

where $R_5$, R6 and $R_7$ each independently represent a hydrogen atom or an alkyl group having 1 or 2 carbon atoms, Y' represents a pendant group, having a saturated or unsaturated alkyl group with from 8 to 24 carbon atoms or having a phenyl group, which is directly bonded to the carbonyl carbon adjacent to Y on the macromolecular main chain side of Y'; or ester, thioester including the carbonyl group adjacent to Y' on the macromolecular main chain side of Y', or amide including the carbonyl group adjacent to Y' on the macromolecular main chain side of Y' and in which the hydrogen on the nitrogen atom may be replaced by an alkyl group having 1 or 2 carbon atoms; ether; thioether; urea; imine or nitrogen containing functional groups in which the hydrogen on the nitrogen atom may be replaced by an alkyl group having 1 or 2 carbon atoms, and e represents an integer of 1 or more.

10. A method of inhibiting the formation of clathrate hydrates as claimed in claim 6, wherein the structural unit (2) comprises a group of the following general formula (8):

(8)

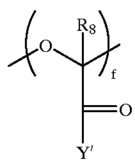

where $R_8$ represents a hydrogen atom or an alkyl group having 1 or 2 carbon atoms, Y' represents a pendant group, having a saturated or unsaturated alkyl group with from 8 to 24 carbon atoms or having a phenyl group, which is directly bonded to the carbonyl carbon adjacent to Y' on the macromolecular main chain side of Y'; or ester, thioester including the carbonyl group adjacent to Y' on the macromolecular main chain side of Y', or amide including the carbonyl group adjacent to Y' on the macromolecular main chain side of Y' and in which the hydrogen on the nitrogen atom may be replaced by an alkyl group having 1 or 2 carbon atoms; ether; thioether; urea, imine or those nitrogen containing functional groups in which the hydrogen on the nitrogen atom may be replaced by an alkyl group having 1 or 2 carbon atoms, and f represents an integer of 1 or more.

11. A method of inhibiting the formation of clathrate hydrates as claimed in claim 6, wherein the structural unit (2) comprises a group of the following general formula (9):

(9)

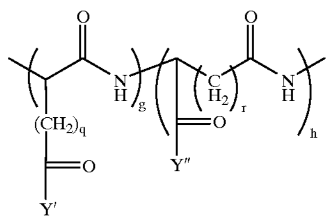

where Y' and Y" each independently represent a pendant group, having a saturated or unsaturated alkyl group with from 8 to 24 carbon atoms or having a phenyl group, which is directly bonded to the carbonyl carbon adjacent to Y' or Y" on the macromolecular main chain side of Y' or Y"; or ester, thioester including the carbonyl group adjacent to Y' or Y" on the macromolecular main chain side of Y' or Y", or amide including the carbonyl group adjacent to Y' or Y" on the macromolecular main chain side of Y' or Y" and in which the hydrogen on the nitrogen atom may be replaced by an alkyl group having 1 or 2 carbon atoms; ether; thioether; urea, imine or nitrogen containing functional groups in which the hydrogen on the nitrogen atom may be replaced by an alkyl group having 1 or 2 carbon atoms, q and r each represents 1 or 2, and g and h each independently represents an integer of 1 or more.

12. A method of inhibiting the formation of clathrate hydrates as claimed in claim 1 wherein the macromolecular compound (I) comprises a structural unit (1) and a structural unit (3) of the following general formula (10) in the molecule:

(10)

$P_3$

Z where $P_3$ represents a macromolecular main chain,

Z represents a dissociating group and/or a salt thereof, which is directly bonded to $P_3$ or is bonded thereto via one or more bonds selected from carbonyl, ester, carbonate, ether, thioester, thioether, amide, urea, urethane, imine, or nitrogen containing functional groups in which the hydrogen on the nitrogen atom may be replaced by an alkyl group having 1 or 2 carbon atoms.

13. A method of inhibiting the formation of clathrate hydrates as claimed in claim 12, wherein the content of X is at or more than 40 mole % when the total amount of Group X and Group Z is 100 mole %.

14. A method of inhibiting the formation of clathrate hydrates as claimed in claim 12, wherein $P_3$ in the structural unit (3) is an alkyl group which is obtained by polymerizing one or more ethylenically unsaturated monomers in which hydrogens may be replaced by alkyl groups having 1 or 2 carbon atoms or by halogen atoms.

15. A method of inhibiting the formation of clathrate hydrates as claimed in claim 12, wherein the structural unit (3) comprises a group of the following general formula (11):

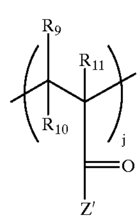

(11)

where $R_9$, $R_{10}$ and $R_{11}$ each independently represent a hydrogen atom or an alkyl group having 1 or 2 carbon atoms, Z' represents a dissociating group and/or a salt thereof, which is directly bonded to the carbonyl carbon adjacent to Z' on the macromolecular main chain side of Z'; or ester, thioester including the carbonyl group adjacent to Z' on the macromolecular main chain side of Z', or amide including the carbonyl group adjacent to Z' on the macromolecular main chain side of Z' and in which the hydrogen on the nitrogen atom may be replaced by an alkyl group having 1 or 2 carbon atoms, ether, thioether, urea, imine or nitrogen containing functional groups in which the hydrogen on the nitrogen atom may be replaced by an alkyl group having 1 or 2 carbon atoms, and i represents an integer of 1 or more.

16. A method of inhibiting the formation of clathrate hydrates as claimed in claim 12, wherein the structural unit (3) comprises a group of the following general formula (12):

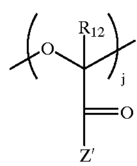

(12)

where $R_{12}$ represents a hydrogen atom or an alkyl group having 1 or 2 carbon atoms, Z' represents a dissociating group and/or a salt thereof, which is directly bonded to the carbonyl carbon adjacent to Z' on the macromolecular main chain side of Z'; or ester, thioester including the carbonyl group adjacent to Z' on the macromolecular main chain side of Z', or amide including the carbonyl group adjacent to Z' on the macromolecular main chain side of Z' and in which the hydrogen on the nitrogen atom may be replaced by an alkyl group having 1 or 2 carbon atoms, ether, thioether, urea, imine or nitrogen containing functional groups in which the hydrogen on the nitrogen atom may be replaced by an alkyl group having 1 or 2 carbon atoms, and j represents an integer of 1 or more.

17. A method of inhibiting the formation of clathrate hydrates as claimed in claim 12, wherein the structural unit (3) comprises a group of the following general formula (13):

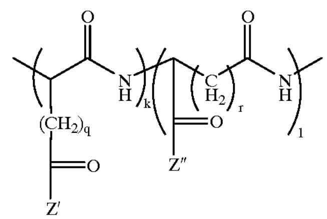

(13)

where Z' and Z" each independently represent a dissociating group and/or a salt thereof, which is directly bonded to the carbonyl carbon adjacent to Z' or Z" on the macromolecular main chain side of Z' or Z"; or ester, thioester including the carbonyl group adjacent to Z' or Z" on the macromolecular main chain side of Z' or Z", or amide including the carbonyl group adjacent to Z' or Z" on the macromolecular main chain side of Z' or Z" and in which the hydrogen on the nitrogen atom may be replaced by an alkyl group having 1 or 2 carbon atoms; ether; thioether; urea, imine or nitrogen containing functional groups in which the hydrogen on the nitrogen atom may be replaced by an alkyl group having 1 or 2 carbon atoms, q and r each represents 1 or 2, and k and l each independently represents an integer of 1 or more.

18. A method of inhibiting the formation of clathrate hydrates as claimed in claim 6, wherein the macromolecular compound (I) further comprises a structural unit (3) of the following general formula (10) in the molecule:

(10)

$P_3$

Z where $P_3$ represents a macromolecular main chain,

Z represents a dissociating group and/or a salt thereof, which is directly bonded to $P_3$ or is bonded thereto via one or more linking groups selected from carbonyl, ester, carbonate, ether, thioester, thioether, amide, urea, urethane, imine, or nitrogen containing functional groups in which the hydrogen on the nitrogen atom may be replaced by an alkyl group having 1 or 2 carbon atoms.

19. A method of inhibiting the formation of clathrate hydrates as claimed in claim 18, wherein when the total amount of Group X, Group Y and Group Z is 100 mole %, the content of X is at or more than 40 mole % and also the content of Y to the total amount of Group Y and Group Z is at or more than 40 mole %.

20. A method of inhibiting the formation of clathrate hydrates as claimed in claim 18, wherein the macromolecular compound (I) comprises a group of the following general formula (14) and/or (15) in the molecule:

(14)

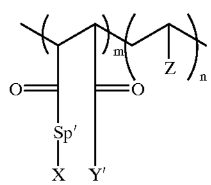

(15)

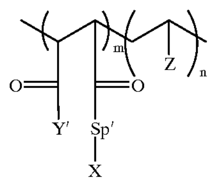

where Sp' represents a direct bond between the carbonyl carbon adjacent to Sp' on the macromolecular main chain side of Sp' and X; or a functional group comprising one or more functional groups selected from linear or branched alkyl groups having from 1 to 24 carbon atoms in which one or more hydrogen atoms may be replaced by halogen atoms or hydroxyl groups; carbonyl; ester, carbonate, thioester, amide, urethane, or carbonyl-group containing functional groups which may include the carbonyl group adjacent to Sp' on the macromolecular main chain side of Sp', or nitrogen containing functional groups in which the hydrogen on the nitrogen atom may be replaced by an alkyl group having 1 or 2 carbon atoms; ether; thioether; urea or imine, X represents a nitrogen-containing 3–15 membered ring group, Y' represents a pendant group, having a saturated or unsaturated alkyl group with from 8 to 24 carbon atoms or having a phenyl group, which is directly bonded to the carbonyl carbon adjacent to Y' on the macromolecular main chain side of Y'; or ester, thioester including the carbonyl group adjacent to Y' on the macromolecular main chain side of Y, or amide including the carbonyl group adjacent to Y' on the macromolecular main chain side of Y' and in which the hydrogen on the nitrogen atom may be replaced by an alkyl group having 1 or 2 carbon atoms; ether; thioether; urea, imine or nitrogen containing functional groups in which the hydrogen on the nitrogen atom may be replaced by an alkyl group having 1 or 2 carbon atoms, Z represents a dissociating group and/or a salt thereof, which is directly bonded to the macromolecular main chain or is bonded thereto via one or more linking groups selected fom carbonyl, ester, carbonate, ether, thioester, thioether, amide, urea, urethane, imine, or nitrogen containing functional groups in which the hydrogen on the nitrogen atom may be replaced by an alkyl group having 1 or 2 carbon atoms, and m and n each independently represent an integer of 1 or more.

21. A method of inhibiting the formation of clathrate hydrates as claimed in claim 18, wherein the macromolecular compound (I) comprises a group of the following general formula (16) and/or (17) in the molecule:

(16)

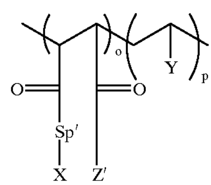

(17)

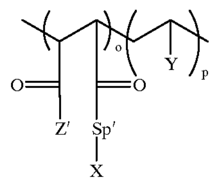

where Sp' represents a direct bond between the carbonyl carbon adjacent to Sp' on the macromolecular main chain side of Sp' and X; or a functional group comprising one or more functional groups selected from linear or branched alkyl groups having from 1 to 24 carbon atoms in which one or more hydrogen atoms may be replaced by halogen atoms or hydroxyl groups, carbonyl, ester, carbonate, thioester, amide, urethane, or carbonyl-group containing functional groups which may include the carbonyl group adjacent to Sp' on the macromolecular main chain side of Sp', or nitrogen containing functional groups in which the hydrogen on the nitrogen atom may be replaced by an alkyl group having 1 or 2 carbon atoms, ether, thioether, urea or imine, X represents a nitrogen-containing 3–15 membered ring group, Y represents a pendant group, having a saturated or unsaturated alkyl group with from 8 to 24 carbon atoms or having a phenyl group, which is directly bonded to the macromolecular main chain or is bonded thereto via one or more linking groups selected from carbonyl, ester, carbonate, ether, thioester, thioether, amide, urea, urethane, imine, or nitrogen containing functional groups in which the hydrogen on the nitrogen atom may be replaced by an alkyl group having 1 or 2 carbon atoms, Z' represents a dissociating group and/or a salt thereof, which is directly bonded to the carbonyl carbon adjacent to Z' on the macromolecular main chain side of Z'; or ester, thioester including the carbonyl group adjacent to Z' on the macromolecular main chain side of Z', or amide including the carbonyl group adjacent to Z' on the macromolecular main chain side of Z' and in which the hydrogen on the nitrogen atom may be replaced by an alkyl group having 1 or 2 carbon atoms, ether, thioether, urea, imine or nitrogen containing functional groups in which the hydrogen on the nitrogen atom may be replaced by an alkyl group having 1 or 2 carbon atoms, and o and p each independently represent an integer of 1 or more.

22. A method of inhibiting the formation of clathrate hydrates as claimed in claim 21, wherein the repeating unit comprising group Y in the general formulae (16) and (17) is (meth)acrylate.

23. A method of inhibiting the formation of clathrate hydrates as claimed in claim 21, wherein the repeating unit comprising group Y in the general formulae (16) and (17) is vinyl ether.

24. A method of inhibiting the formation of clathrate hydrates as claimed in claim 21, wherein the repeating unit comprising group Y in the general formulae (16) and (17) is styrene.

25. The method of inhibiting the formation of clathrate hydrates as claimed in claim 1, wherein the clathrate hydrate inhibitor is added to the system after having been dissolved in water and/or a water-miscible solvent.

26. The method of inhibiting the formation of clathrate hydrates as claimed in claim 1, wherein the clathrate hydrate inhibitor is added to the system capable of forming clathrate hydrates in an amount of from 0.01 to 30 parts by weight relative to 100 parts by weight of the free water existing in the system.

27. A method of inhibiting the formation of clathrate hydrates as claimed in claim 2, wherein the macromolecular compound (I) comprises a structural unit (1) and a structural unit (2) of the following general formula (6) in the molecule:

(6)

$P_2$—Y where $P_2$ represents a macromolecular main chain,

Y represents a pendant group, having a saturated or unsaturated alkyl group with from 8 to 24 carbon atoms or having a phenyl group, which is directly bonded to $P_2$ or is bonded thereto via one or more bonds selected from carbonyl, ester, carbonate, ether, thioester, thioether, amide, urea, urethane, imine, or nitrogen containing functional groups in which the hydrogen on the nitrogen atom may be replaced by an alkyl group having 1 or 2 carbon atoms.

28. A method of inhibiting the formation of clathrate hydrates as claimed in claim 4, wherein the macromolecular compound (I) comprises a structural unit (1) and a structural unit (2) of the following general formula (6) in the molecule:

(6)

$P_2$—Y where $P_2$ represents a macromolecular main chain,

Y represents a pendant group, having a saturated or unsaturated alkyl group with from 8 to 24 carbon atoms or having a phenyl group, which is directly bonded to $P_2$ or is bonded thereto via one or more bonds selected from carbonyl, ester, carbonate, ether, thioester, thioether, amide, urea, urethane, imine, or nitrogen containing functional groups in which the hydrogen on the nitrogen atom may be replaced by an alkyl group having 1 or 2 carbon atoms.

29. A method of inhibiting the formation of clathrate hydrates as claimed in claim 2 wherein the macromolecular compound (I) comprises a structural unit (1) and a structural unit (3) of the following general formula (10) in the molecule:

(10)

$P_3$—Z where $P_3$ represents a macromolecular main chain,

Z represents a dissociating group and/or a salt thereof, which is directly bonded to $P_3$ or is bonded thereto via one or more bonds selected from carbonyl, ester, carbonate, ether, thioester, thioether, amide, urea, urethane, imine, or nitrogen containing functional groups in which the hydrogen on the nitrogen atom may be replaced by an alkyl group having 1 or 2 carbon atoms.

30. A method of inhibiting the formation of clathrate hydrates as claimed in claim 4, wherein the macromolecular compound (I) comprises a structural unit (1) and a structural unit (3) of the following general formula (10) in the molecule:

(10)

$P_3$—Z where $P_3$ represents a macromolecular main chain,

Z represents a dissociating group and/or a salt thereof, which is directly bonded to $P_3$ or is bonded thereto via one or more bonds selected from carbonyl, ester, carbonate, ether, thioester, thioether, amide, urea, urethane, imine, or nitrogen containing functional groups in which the hydrogen on the nitrogen atom may be replaced by an alkyl group having 1 or 2 carbon atoms.

31. A method of inhibiting the formation of clathrate hydrates as claimed in claim 27, wherein the macromolecular compound (I) further comprises a structural unit (3) of the following general formula (10) in the molecule:

(10)

$P_3$—Z where $P_3$ represents a macromolecular main chain,

Z represents a dissociating group and/or a salt thereof, which is directly bonded to $P_3$ or is bonded thereto via one or more linking groups selected from carbonyl, ester, carbonate, ether; thioester, thioether; amide, urea, urethane, imine, or nitrogen containing functional groups in which the hydrogen on the nitrogen atom may be replaced by an alkyl group having 1 or 2 carbon atoms.

32. A method of inhibiting the formation of clathrate hydrates as claimed in claim 28, wherein the macromolecular compound (I) further comprises a structural unit (3) of the following general formula (10) in the molecule:

(10)

$P_3$—Z where $P_3$ represents a macromolecular main chain,

Z represents a dissociating group and/or a salt thereof, which is directly bonded to $P_3$ or is bonded thereto via one or more linking groups selected from carbonyl, ester, carbonate, ether; thioester, thioether; amide, urea, urethane, imine, or nitrogen containing functional groups in which the hydrogen on the nitrogen atom may be replaced by an alkyl group having 1 or 2 carbon atoms.

33. The method of inhibiting the formation of clathrate hydrates as claimed in claim 4, wherein the clathrate hydrate inhibitor is added to the system after having been dissolved in water and/or a water-miscible solvent.

34. The method of inhibiting the formation of clathrate hydrates as claimed in claim 4, wherein the clathrate hydrate inhibitor is added to the system after having been dissolved in water and/or a water-miscible solvent.

35. The method of inhibiting the formation of clathrate hydrates as claimed in claim 2, wherein the clathrate hydrate inhibitor is added to the system capable of forming clathrate hydrates in an amount of from 0.01 to 30 parts by weight relative to 100 parts by weight of the free water existing in the system.

36. The method of inhibiting the formation of clathrate hydrates as claimed in claim 4, wherein the clathrate hydrate inhibitor is added to the system capable of forming clathrate hydrates in an amount of from 0.01 to 30 parts by weight relative to 100 parts by weight of the free water existing in the system.

* * * * *